Oct. 20, 1953
C. H. VLACHOS ET AL
2,655,785
HYDRAULIC PUMP AND MOTOR TRANSMISSION
AND GAS PRESSURE PRIME MOVER THEREFOR
Filed June 9, 1949
5 Sheets-Sheet 2
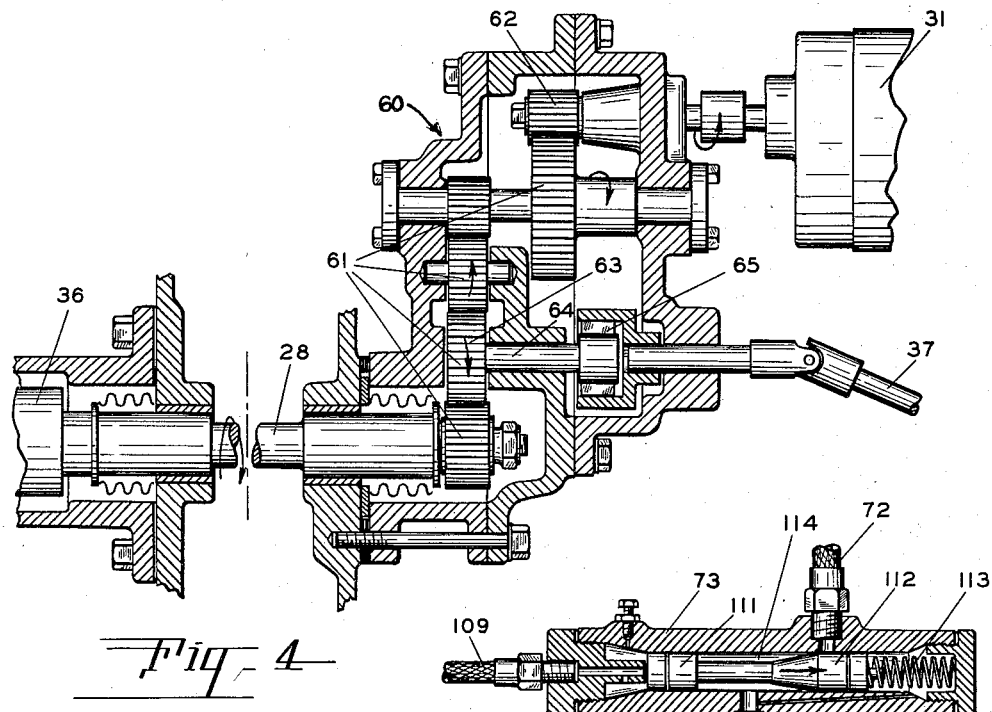
_Fig. 4_
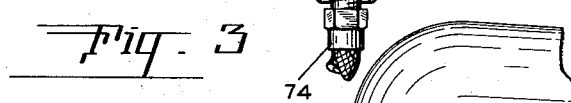
_Fig. 3_
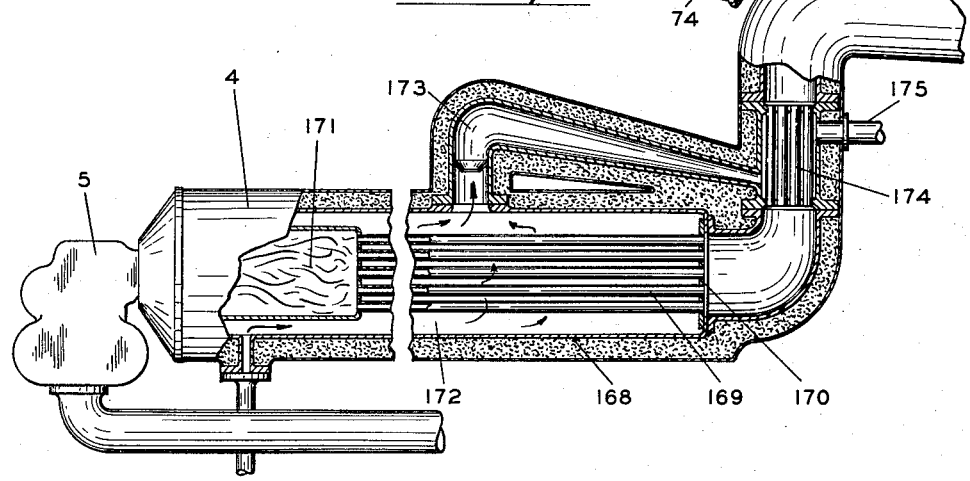
_Fig. 2_
INVENTORS
CONSTANTINOS H. VLACHOS
EARL M. WARD
BY
ATTORNEY

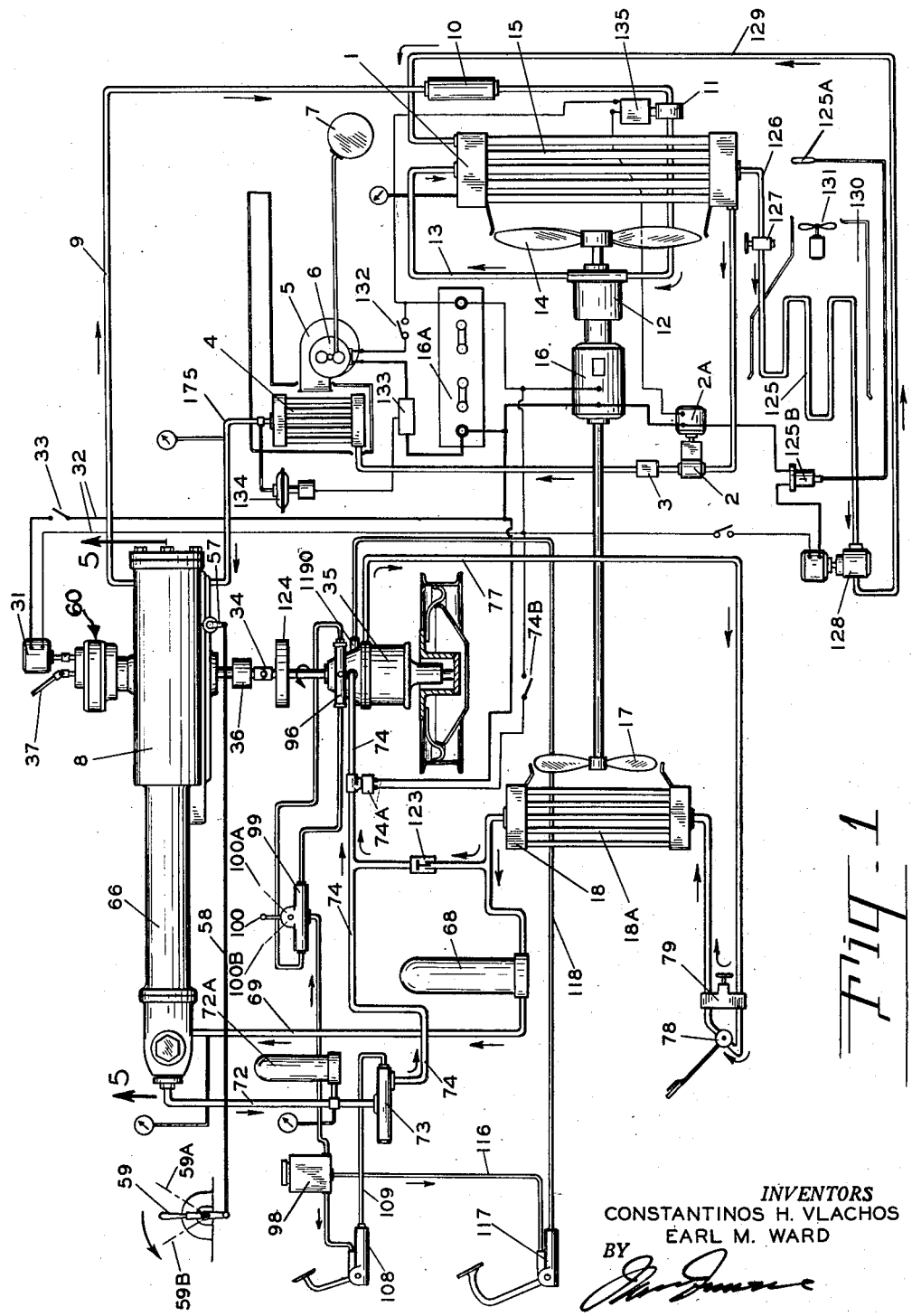

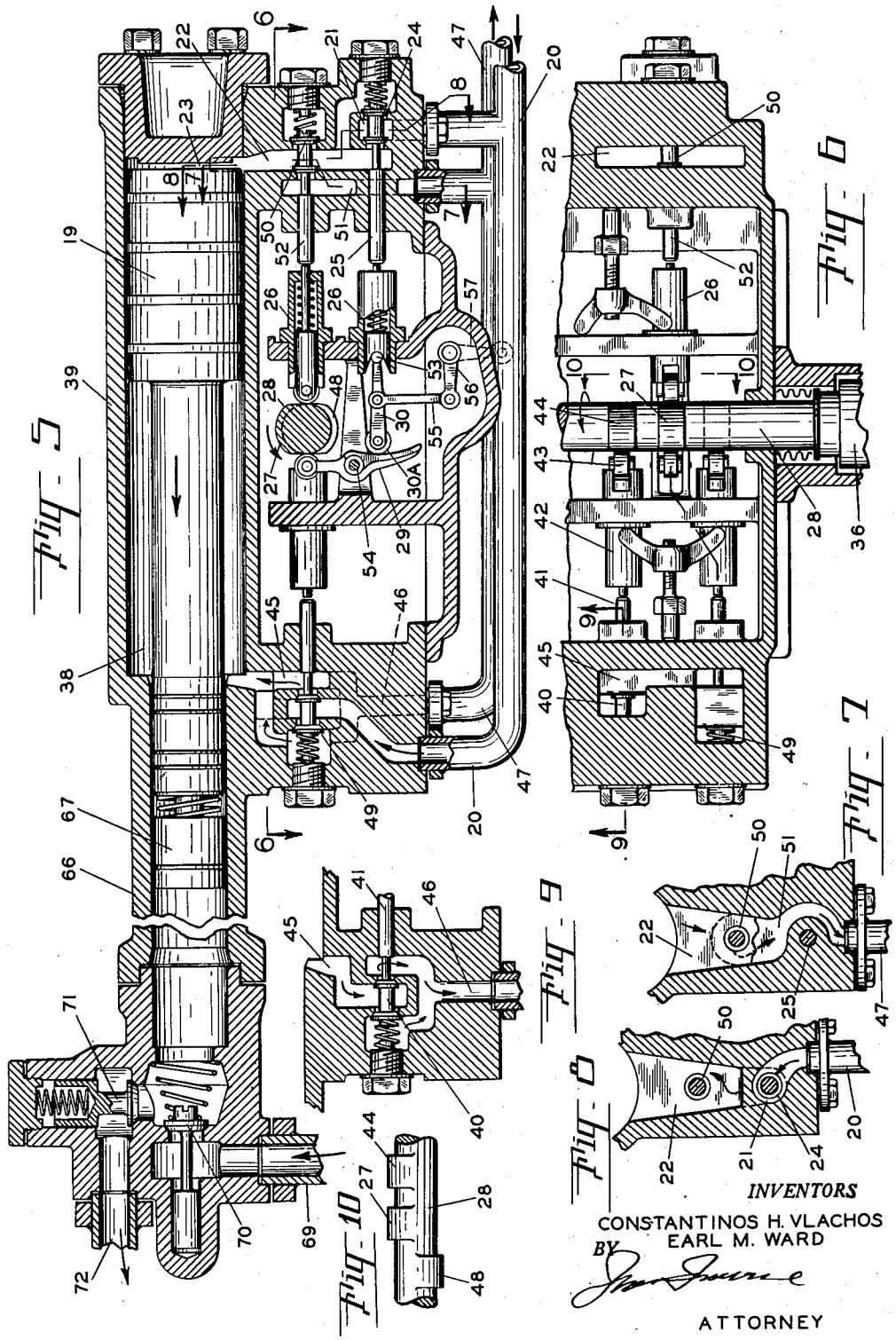

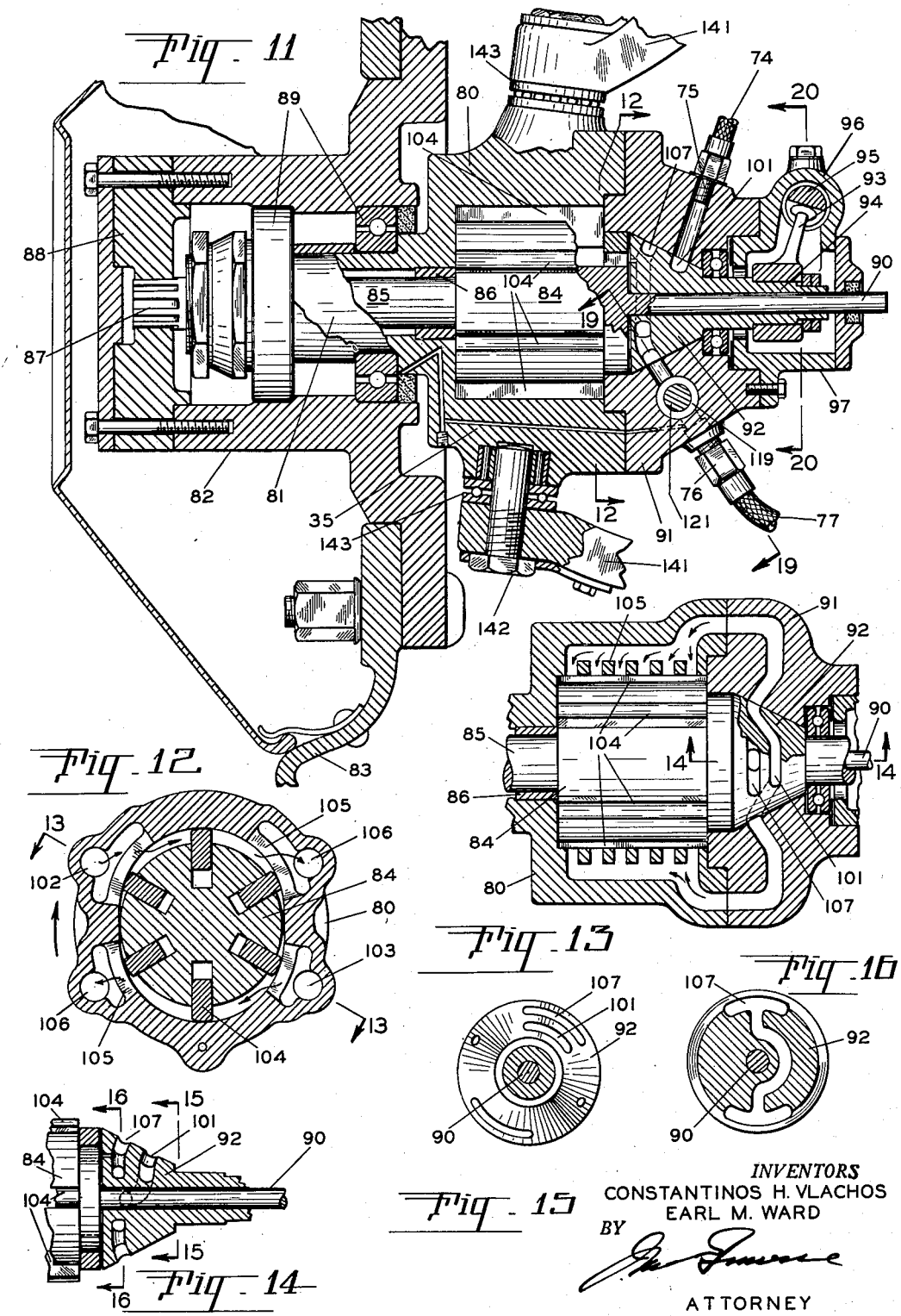

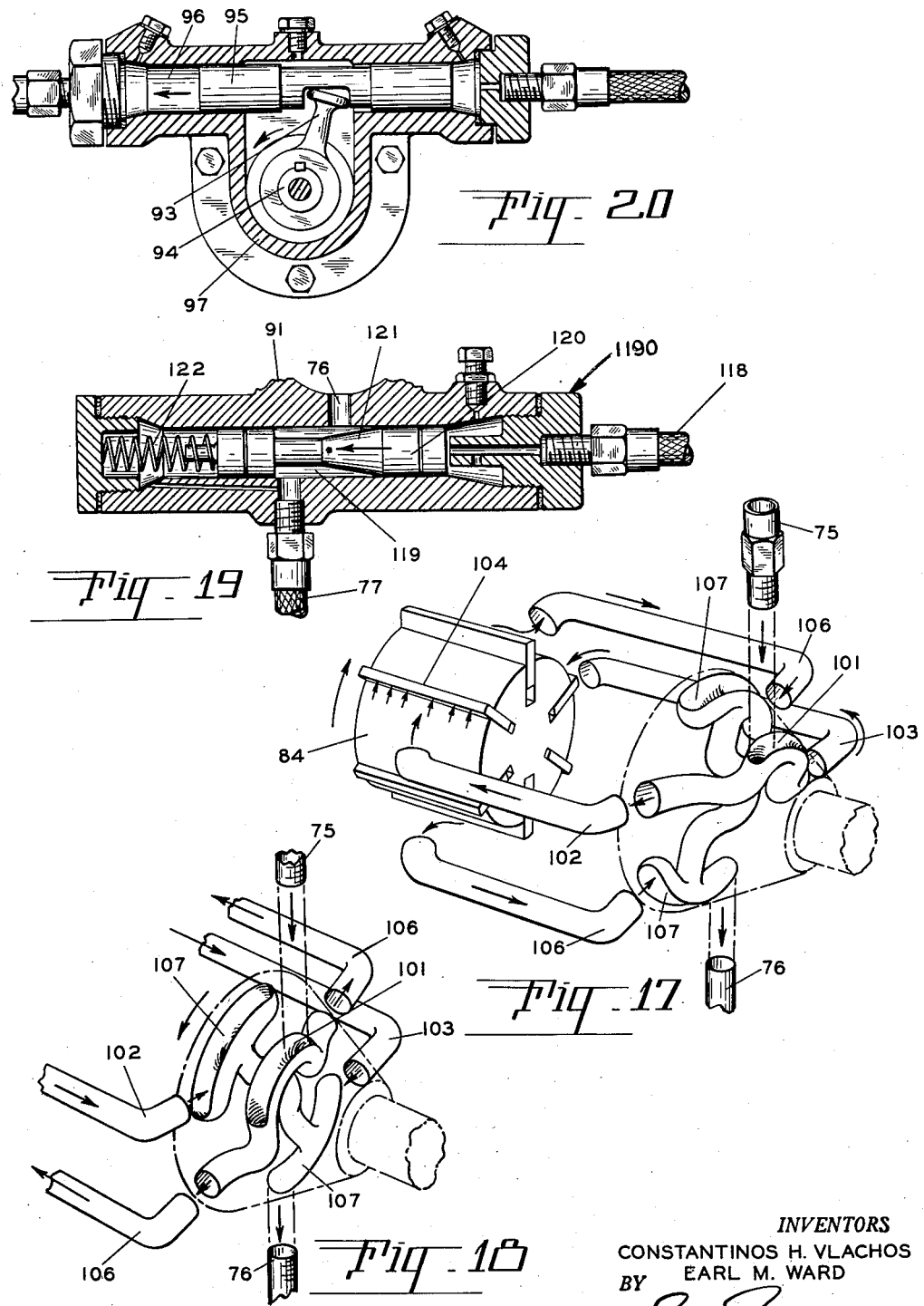

Patented Oct. 20, 1953

2,655,785

UNITED STATES PATENT OFFICE 2,655,785

HYDRAULIC PUMP AND MOTOR TRANSMISSION AND GAS PRESSURE PRIME MOVER THEREFOR

Constantinos H. Vlachos, Vancouver, Wash., and Earl M. Ward, Portland, Oreg.; said Ward assignor to said Vlachos Application June 9, 1949, Serial No. 98,102

6 Claims. (Cl. 60—19)

This invention relates to a new and novel construction of a self-propelled vehicle, and has for its principal object a source of power consisting of a thermodynamic cycle, utilizing pressure of gas converted to hydraulic pressure to apply force directly to the driving wheels. This new principle of power application we will name the hydro-gas-power cycle.

The source of energy is heat supplied by the combustion of a carbonous fuel and air or other source of heat energy in a reversed principle of the thermodynamic cycle of refrigeration which raises the pressure of gas refrigerant, and by a pressure conversion device of new and novel construction in operating principle, applies pressure to a liquid, which by hydraulic principles and mechanical means kinetic energy is produced for driving the vehicle.

Another object of this power plant construction is to place the individual functional units so as to obtain a more equal balance of weight suspension.

A still further object of this new and novel hydro-gas-power application is to make possible a quiet operating vehicle, economical to operate, relatively free from vibration and automatic in function, bringing comfort and safety to the occupants of a motor vehicle.

A further object of this invention is to provide a frame having dual functional structures. One of its functions is to provide part of the hydro-gas-power circuit, while the other function is to suspend the load to the wheels carrying out the above object.

In order to illustrate more fully the invention, we have shown by drawings and description the embodiments of the construction, principles of operation and the basic functions of the units.

Referring to the drawings:

Figure 1 is a diagrammatical layout of our new and improved hydro-gas power circuit.

Figure 2 is a partially in section detail of the gas pressure generating unit assembly.

Figure 3 is a sectional view of the hydraulic throttle control for metering hydraulic fluid to the motors located in the wheels.

Figure 4 is an enlarged sectional view of the mechanism which drives the cam shaft for controlling the valve action of the gas pressure motor.

Figure 5 is an enlarged sectional view of the gas pressure motor taken on line 5—5 of Figure 1.

Figure 6 is a fragmentary longitudinal sectional view of the gas pressure motor, taken on line 6—6 of Figure 5 on the plane of the cam shaft, illustrating the valve and cam action.

Figure 7 is a fragmentary sectional view, taken on line 7—7 of Figure 5, illustrating the exhaust gas passageway at the head end of the gas cylinder.

Figure 8 is a fragmentary sectional view, taken on line 8—8 of Figure 5, illustrating the gas intake passageway and valve associated therewith at the head end of the gas cylinder.

Figure 9 is an enlarged fragmentary sectional view, taken on line 9—9 of Figure 6, illustrating the exhaust valve disposed on the opposite end of the gas cylinder.

Figure 10 is a fragmentary side view of the cam shaft, taken on line 10—10 of Figure 6.

Figure 11 is an enlarged fragmentary sectional view taken through one of the hydraulic driving motors mounted to the hub of one of the wheels.

Figure 12 is a sectional end view through the rotor of the motor, taken on line 12—12 of Figure 11.

Figure 13 is a fragmentary sectional view of the motor showing the construction of the passage ports in the rotor housing and control valve, taken on line 13—13 of Figure 12.

Figure 14 is an enlarged sectional view of the valve associated with the rotor for controlling the flow of fluid in and out of the rotor. This view is taken on line 14—14 of Figure 13.

Figure 15 is an end sectional view of the valve, taken on line 15—15 of Figure 14.

Figure 16 is a further sectional end view of the valve showing the transverse port passage, taken on line 16—16 of Figure 14.

Figure 17 is an exploded diagrammatical view of the liquid passageways associated with the control valve and the rotor housing. This view corresponds with the position of the parts illustrated in Figures 11 to 16 inclusive, showing clockwise rotation.

Figure 18 illustrates a diagrammatical view of the liquid passageways in the parts illustrated in Figures 11 to 16 inclusive, except the ports are located in a position to reverse the rotation of the rotor.

Figure 19 is an enlarged fragmentary sectional view of the brake metering valve. This view is taken on line 19—19 of Figure 11.

Figure 20 is an end sectional view looking towards the rotor and valve. This view illustrates the fluid operated control for rotating the valve to either forward or reverse positions, taken on line 20—20 of Figure 11.

Referring more specifically to the drawings:

In the carrying out of the primary object of our invention in the development of hydro-gas power for vehicles and the like, we employ a reverse flow of the "Carnot" thermodynamic cycle utilizing a liquid gas refrigerant as the heat carrying media.

Starting from the condensing unit 1, Figure 1, this liquid gas is pumped from the said condenser by way of the injection pump 2, through a filter 3 into the gas pressure generator unit 4. Heat is inducted into the liquid gas in the pressure generator 4 by the automatic oil burner 5, but not limited thereto, which is driven by the electric motor 6 and supplied with fuel from the tank 7. The automatic oil burner 5 has a two stage combustion and constant fuel air ratio.

When the liquid delivered to the generator 4 is converted into a gas by the application of heat it is delivered to a gas pressure motor 8, then returned back through the line 9 through the oil separator and dehydrator 10 and a pressure control valve 11, driving the gas pressure operated motor 12, returning through the piping 13 into the condenser from where it started. The gas pressure operated motor 12 drives the fan 14 which directs air across the condensing tubes 15 of the condensing unit 1.

The gas pressure motor 12 also drives the electric generator 16 for charging the battery 16A, together with the fan 17 for cooling the hydraulic heat exchanger 18. This said heat exchanger will be described later. The gas pressure motor 8, Figures 1 and 5, is a free floating piston type.

We will now describe the valve mechanism for controlling the flow and expansion of the gas within the gas pressure motor 8. In Figures 5 and 6 the motor is shown in a position with all valves closed. We will assume the gas under pressure is about to move the piston 19 in the direction of the arrow. Gas will enter through the manifold 20 into the valve chamber 21, through the valve 24 when said valve is opened admitting gas into the chamber 22, thence into the cylinder 39 at 23 against the piston head forcing the same in the direction indicated.

We will now describe how the valve 24 is opened to admit this gas into the above said cylinder. The valve 24 is opened by way of the valve stem 25 and valve lifting assembly 26, which in turn is operated from the cam 27 of the cam shaft 28 through the rocker arm 29 by way of the push rod 30. The cam shaft 28 is revolved by two different methods. First by an electric motor 31, receiving its electrical energy from the battery 16A through the wiring 32 and control switch 33, or by a direct drive by way of the universal shaft connection 34 driven from the hydraulic wheel motor 35 located in the left rear wheel. When motors 35 and the vehicle are being operated in reverse direction, a universal connection 37 is driven by one of the other driving motors 35 driving the cam shaft always in the same direction of rotation as will be later described and as indicated by the arrow in Figures 4 and 5. When the piston 19 travels in the direction of the arrow, exhaust gas within the end 38 of the cylinder 39 will be exhausted. This is accomplished by opening an exhaust valve 40 through its stem 41, valve lifting mechanism 42, operated by the cam roller 43 from the cam 44 (Fig. 6). This permits the gases to flow from the end 38 of the cylinder 39 into the chamber 45 through the valve 40, through the port 46 into the exhaust manifold 47.

We will now describe the return stroke of the piston 19 in the opposite direction of the arrow. When the cam shaft 28 rotates 180 degrees from the position shown in Figure 5, the intake valve 24 and the exhaust valve 40 will remain closed for the next 180 degrees. At this time the cam 48 will open the intake valve 49, referring to Figures 5 and 6, permitting gas to enter through the manifold 20 into the chamber 45 through the intake valve 49 into the end 38 of the cylinder 39 behind the piston 19. The previous gas ahead of the piston 19 will be exhausted into the chamber 22 through the exhaust valve 50 into the chamber 51, thence to the exhaust manifold 47. The exhaust valve 50 is operated from the cam 27, valve lifter 26 and its valve stem 52 exhausting the said gas from the chamber 22 as above stated.

In order to throttle and control the pressure within the cylinder 39, the amount of gas allowed to enter through the intake valve 24 will be controlled as follows. The push rod 30 is pivotally seated at 53 within the valve lifter mechanism, referring to Figure 5, at its one end and is adapted to have its opposite end moved towards or away from the pivot point 54 of the rocker arm 29 by the connecting link 55, crank 56, which is associated with the control lever 57, which in turn is operated by the control rod 58 and throttle lever 59 conveniently located to the operator as shown in Figure 1.

If it is desired to reduce the gas pressures exerted against the piston 19, the roller 30A of the push rod 30 is moved towards the pivot point 54 of the rocker arm 29. The rocker arm then will exert a relatively short stroke to the push rod and valve stem 25, consequently the valve 24 will only be slightly opened. In order to increase the pressure to be applied to the piston 19, the roller 30A will be moved by the control levers 57 and 59 above described further away from the pivot 54, at which time the rocker arm will exert a greater movement to the said push rod and valve stem 25 opening the valve 24 wider, admitting a greater volume of gas into the cylinder.

Having just touched lightly on the cam shaft driving mechanism, we will now return to this mechanism describing its operation in further detail. Referring to Figure 4, the electric motor 31 drives the cam shaft 28 through a coupling and gearing in a gear box 60 consisting of the chain of gears 61 by way of the pinion 62 so that the cam shaft 28 will be rotating in the direction of the arrow, and in the same direction that the universal shaft 34 drives the said cam shaft from the hydraulic motor 35, as shown in Figure 1.

The motor 31 takes care of the operation of the gas pressure motor when the vehicle is either standing still or at very low travelling speed. The universal drive shaft 34 from the hydraulic motor 35 takes over after a predetermined speed has been attained. The universal shaft 37, referring to Figures 1 and 4, is driven from the right rear wheel not shown, and in turn drives the cam shaft 28 in the direction of the arrow through the gear 63 and shaft 64 until the right rear wheel attains a speed above that of the motor driven shaft so as to drive through the over-running clutch 65 while the vehicle is travelling in a reverse direction. When the cam shaft 28 is being operated by the universal shaft 37, an over-running clutch 36 disconnects the drive through the universal 34 between the hydraulic motor 35 in the left rear wheel and the cam shaft 28.

We will now describe the operation of the hydraulic pressure developed by the operation of the piston 19. A hydraulic pump 66 is formed integral and part of the cylinder 39 and has a spring-cushioned piston 67 for developing a relatively high pressure within the pump 66 to be converted to a hydraulic pressure for operating the hydraulic motors located in the driving wheels of the vehicle. Referring to Figure 1, we have illustrated only one wheel with one hydraulic motor and one cylinder gas motor for convenience of illustration. There would be at least three or more cylinders in the gas motor.

Hydraulic fluid is contained within any suitable reservoir as indicated at 68. This fluid is drawn into the pump 66 by way of the pipe 69, referring to Figure 5, and is drawn through the check valve 70 into the said pump when the piston 67 is travelling in the opposite direction to the arrow. On the return stroke of the piston 67, in the direction of the arrow, the hydraulic fluid is forced out through the check valve 71 into the pipe line 72, throttle control valve 73, pipes 74 to the hydraulic motor 35, referring to Figure 11, by way of the inlet 75, out the exhaust fitting 76, piping 77 through the emergency brake control valve 78 and bypass control valve 79 into the heat exchanger 18 back into the reservoir 68 and back to cylinder 66 of the hydraulic pump 66—67.

Our new and improved hydraulic motor 35 is built into the hub of the wheel and consists of a rotor housing 80 having a wheel axis spindle 81 formed on one of its ends and adapted to receive the hub 82 of the wheel 83 thereon. A rotor 84 is rotatably mounted within the rotor housing 80 by way of the shaft 85 operating within bearing 86 within the housing 80 and extending beyond the said housing spindle 81 where it terminates in a splined end 87, which cooperates with the driving member or head 88 which forms part of the wheel hub 82 within the cap thereof. The wheel hub 82 is journalled to the axle spindle 81 by way of the bearings 89.

Extending on the opposite end of the rotor 84 to that of the shaft 85 is a driving shaft 90, Figure 11, which drives the universal drive shaft 34, Figure 1, and operates the above described cam shaft 28. Mounted to one end of the rotor housing 80 is a valve housing 91, Figure 13, in which is rotatably mounted a cone shaped inlet and outlet valve 92 for controlling the hydraulic fluid for driving the said motor.

Referring to Figures 11 to 17 inclusive, the valve 92, Figure 13, is set to cause the rotor 84 to rotate in the direction of the arrows or clockwise as shown in Figure 17, while in the diagrammatical Figure 18, the valve is set to cause the rotor to travel in the direction of the arrow, or anti-clockwise. Referring particularly to Figure 11, the cone valve 92 is revolved within the valve housing 91 and around the rotor shaft 90 by the lever 93, shown in Figure 20, which is keyed to the hub 94 of the said valve.

A floating piston 95 is adapted to operate within the cylinder 96 which forms part of the valve operating mechanism in housing 97. The piston 95 is operated by hydraulic fluid from an independent hydraulic liquid supply tank indicated at 98, Figure 1, through a standard double acting master cylinder 99 which is manually controlled. When the lever 100 is moved in one direction it will move the piston 95, Figure 20, within the cylinder 96 in this predetermined direction.

This will move the lever 93, rotating the valve 92, Figure 13, to the position indicated in Figure 18, reversing the direction of the rotor 84 or opposite to the arrow indication in Figure 17, and vice versa, the moving of the lever 100, Figure 1, forces fluid against the opposite end of the piston 95, Figure 20, moving the same opposite to the arrow and rotating the crank 93 and valve 92 to the position illustrated in the views in Figures 11, 16, 17 and 20.

We will now follow the path of the hydraulic driving fluid from the source of supply and through the motor. The volume of the fluid supplied by the hydraulic piston 67 driven by the gas motor 8, Figure 1, is the same as the volume required to drive the hydraulic wheel driving motors 35. That is, one revolution of the cam shaft 28 provides one delivery stroke for each of the hydraulic pistons 67, Figure 5, which is the quantity or volume of hydraulic fluid required to rotate the hydraulic wheel motors 35, Figures 1 and 11, one revolution each, but not limited to this revolution to volume ratio.

This driving fluid is delivered to the valve housing 91, Figures 11 and 17, by way of the connection 75 from the piping 74, Figures 1 and 11, into the port 101, Figure 17, and into the ports 102 and 103 located within the rotor housing 80 from where the fluid is directed against the rotor blades 104 through the bridges 105, Figures 12 and 13, rotating the rotor in the direction of the arrow, referring particularly to Figure 17.

The exhaust of the pressure fluid takes place through the bridges 105 into the exhaust ports 106, Figure 12, thence to the valve port 107, Figure 17, and out the outlet 76, through pipe 77 back to the heat exchanger 18 and the remainder of the hydraulic circuit. When the control lever 100, Figure 1, is moved to a position to cause the piston 95, Figure 20, to rotate the valve 92, Figures 11 and 13, in the direction of the arrow, Figure 20, or to the position illustrated in Figure 18, the rotation of the rotor will be reversed due to the fact that the ports of the valve 92 directs the flow of fluid into the ports 106 of the housing 80, Figure 12, directing the pressure of the fluid to opposite sides of the rotor driving blades or vanes 104, rotating the rotor 84 in the direction of the arrow shown in Figure 18, and opposite to the rotation in direction of the arrow in Figure 17. The ports 102 and 103 which were inlet passages illustrated in Figure 17 are now exhaust passages illustrated in Figure 18, the fluid passing out through the fitting 76, Figures 17, 18 and 11, into the pipe 77, Figure 1.

We will now describe the throttling or controlling of the speed of rotation of the hydraulic motors located within the wheels of the vehicle. A hydraulic actuating unit of standard construction is indicated at 108, Figure 1. This actuator receives hydraulic fluid from the independent supply tank 98 and forces the same through the piping 109 into the throttle control valve 73, Figure 3, by way of the pipe 109. This pressure forces the piston 111 and the tapered throttle valve 112, Figure 3, in the direction of the arrow against the pressure spring 113, graduating the flow of high pressure hydraulic fluid from the gas motor 8 through the supply pipe 72 and into the valve chamber 114, Figure 3, from where it leaves by way of the pipe 74 to the motor 35, Figure 1. The piston 111 and valve 112, Figure 3, are balanced when pressure exists within the chamber 114.

We will now describe the operation of our braking system relative to our new and improved motor vehicle. Referring to Figures 1 and 19, hydraulic fluid is delivered by way of the pipe 116 to the fluid actuator 117 of standard construction, which delivers fluid under pressure through the line 118 to the brake throttling metering valve 119Ø. The brake throttling valve is built into the valve housing 91 (Figure 11), looking in the direction of line 19—19. Pressure is applied to the floating piston 120 formed with a tapered portion 121, forcing the piston 120 in the direction of the arrow against the spring 122.

As this piston valve of each wheel motor 35 travels in the direction of the arrow, it gradually cuts off the flow of fluid flowing through the cylinder space 119 delivered from the rotor 84, Figures 11 and 12, by way of the port 76 thereby restricting the flow of fluid, retarding the rotation of the rotor. As the said flow is restricted the motor is converted into a pump applying a resistance to the rotation of the wheel, the amount of resistance depending upon the position of the tapered portion 121 of the metering valve piston 120, restricting the flow of fluid from said rotor to exhaust pipe line 77, Figures 1 and 19.

In the supply lines leading to each wheel motor is located a solenoid cut-out valve 74A for cutting off the fluid supply to said individual motor. The object of these cut-off valves is to stop the flow of fluid to any wheel that may be spinning for the lack of traction, thereby delivering full power to the wheels having traction. These solenoid cut-off valves are push button controlled by the switch 74B located at a place convenient to the operator.

We will now describe what happens when the vehicle is coasting requiring no driving power. The throttle control valve 73, Figures 1 and 3, is closed by the release of the throttle control actuator 108. This creates a fluid block against the hydraulic pump pistons 67, Figures 1 and 5, which overcomes the pressure of the gas being applied to the piston 19, Figure 5, therefore the piston assembly will come to rest, due to the closing of the throttle 73. The pumping action created within the motors 35 by the coasting of the vehicle pumps fluid from the motors through the piping 77, through the open emergency brake control valve 78 through the hydraulic heat exchanger 18 bypassing the reservoir 68 and the hydraulic pump 66—67 by way of the check valve 123 into the line 74, leading back to the motors 35.

We will now describe the operation of the emergency brake. The emergency brake valve 78 is merely brought to closed position blocking the circulation of the oil from the motors through the above described liquid circuit. In order to prevent abrupt stopping of the rotation of the wheels causing a skid, an adjustable bypass relief valve 79 releases the initial heavy pressure developed by the liquid circulating within the line, gradually applying the emergency brake, bringing the car to a stop and holding the same in a stationary condition.

In case of the failure of the above described braking system an auxiliary brake, preferably mechanical, may be applied through the brake drum 124, Figure 1. This brake drum is directly connected to the shaft of the motor 35 of the rear wheels.

In the operation of our new and improved gas and hydraulic operated vehicle, it is a well known fact that heat will be developed within the hydraulic circuit due to hydrodynamic characteristics, therefore the hydraulic fluid is passed through the tubes 18A of the heat exchanger 18, Figure 1. These tubes are cooled by the fan 17 driven by the gas motor 12.

The gas driven motor 12 drives the fans 14 and 17, Figure 1. The construction of the gas motor 12 is similar to the hydraulic motor 35, Figure 11, excepting the valves. This motor 12 rotates in one direction only. The revolution per minute depends on the volume of the gas flowing through it, which is in direct relation to the amount of gas required to propel the vehicle. The speed of the motor 12 is independent of the speed of the wheel motor 35, because when climbing a hill more gas pressure in the converter 8 is required to propel the vehicle than when travelling on level terrain. Consequently more gas will pass through the motor 12 and into the condenser 1, which will require a greater volume of air for cooling. The speed of the motor 12 is directly proportional to the volume of gas flowing through it, which is directly proportional to condensing requirements within the condenser 1, thus becoming automatic in speed control.

Air within the vehicle is conditioned by refrigerant coils 125, Figure 1. Liquid refrigerant is circulated from the bottom of the condenser 1 through the pipe 126 and the usual expansion valve 127.

The evaporated gas within the coils 125 is compressed by the compressor 128 so that it will be in the form of high pressure gas and delivered through the line 129 into the condenser 1, completing its refrigerating cycle. The coils 125 are located within a housing 130 from where the cooled air is drawn off and distributed within the vehicle by the conventional blower fan 131. The temperature within the vehicle is automatically controlled by the thermostat 125A and control switch 125B.

We will now describe the operation of our hydro-gas power system in operating a vehicle. Referring to Figure 1, the first step is to close the electric switch 132. This starts the oil burner motors 6, which will have an automatic lighter, delivering electric energy from the battery 16A through the automatic rheostat control switch 133 to the said motor 6. This begins to heat the gas pressure generator 4, which from this point on is automatically controlled by the pressure control 134 by way of the rheostat control switch 133 above mentioned. This controls the heat output of the burner 5 to the desired amount for maintaining the proper gas pressure within the gas pressure generator 4.

An automatic pressure control switch 135 controls the operation of the pump 2 by way of its driving motor 2A. This switch 135 will be normally open and when pressure is developed within the condenser to a predetermined amount, the contact points will close the electric circuit between the battery 16A and the motor 2A which will start driving the pump withdrawing refrigerant from the condenser 1, delivering the same into the generator 4. When the pressure within the condenser 1 returns to normal or low, the switch 135 will be opened, thereby stopping the pump 2.

When the gas has been brought to the proper pressures for operating the vehicle, the switch 33 is closed starting the motor 31, which in turn drives the cam shaft 28 within the gas motor 8, referring to Figures 1, 4, 5 and 6. This shaft is revolved all the time that the motor vehicle is being used, either standing or moving.

We will now describe how the vehicle is set in forward motion. Referring to Figure 5, when the vehicle is standing still, either before or after the cam shaft 28 is revolved, the push rod 30 will be adjusted by lever 59 in a straight line between the pivot point 54 of the rocker arm 29 and the valve lifter 26 so that when the rocker arm is being rocked by the cam 28, it will have no effect on the opening of the valve 24 and no gas will be admitted into the passages 22 and 45.

Referring to Figure 1, the lever 59 would be in the position indicated by the broken line 59A. In order to move the vehicle forward the lever 59 is moved in the direction of the arrow for normal cruising speeds, the lever being in the position shown in the drawings, but on hills it will be towards the broken line position 59B. As stated above in our description of the gas motor 8, Figure 5, the further that the push rod 30 moves away from the pivot point 54, the greater will be the opening of the valve 24 permitting a greater volume of gas into the cylinder 39 from the passages 22 and 45 for operating the piston 19.

When the gas enters into the cylinder 39 it forces the piston 19 in the direction of the arrow as above described, causing the piston 67 to force hydraulic fluid out through the valve 71 and the pipe 72 through the throttling control valve 73, Figures 1 and 3, pipe line 74, Figure 1, into the motor 35.

As described previously there is a motor on each of the wheels, all wheels being driven independently. As described previously the throttle valve 73 is operated by the actuator 108, which will permit the desired amount of hydraulic fluid being delivered by the hydraulic pump 66—67 to the motors 35 thereby controlling the speed of the vehicle.

When the flow of the hydraulic fluid is resisted, it provides sufficient back pressure against the piston 67 of the hydraulic pump, Figure 5, to overcome the pressures developed by the gas pressure from the gas generator 4 in gas motor 8, Figures 1 and 2, even though the cam shaft 28 continues to open the valve 24 beyond the requirements. When the vehicle is coasting the control valve 73 is entirely closed, closing the flow of the hydraulic fluid completely off and providing a complete stoppage of the movement of the pistons 67 and 19, but at the same time this happens the motors 35 become pumps, circulating the fluid through the line 77, heat exchanger 18, past the check valve 123, back into the line 74, into the motors and as above described. This flow may be stopped by the emergency brake 78, or by the foot operated brake actuator 117, which causes the taper 121 of the piston 120 to cover the opening 76, Figure 19, connecting line 77, thereby applying the brake by putting a resistance against the rotation of the rotor 84, Figure 17, opposite to the pressure indicated by the arrows.

When it is desired to reverse the direction of the motor 35 and operate the vehicle in the opposite direction, the control lever 100, Figure 1, is moved to the position indicated by the broken line 100B. This revolves the valve 92, Figure 11, to its reverse running position as indicated in Figure 18 and by the arrow in Figure 20. When the lever 100 is in the position shown in Figure 1, the valve 92 is in neutral position within the motor and will resist all flow of fluid through the motor ports.

In order to prevent the lever 100 from being moved into the netural position from the running position while the vehicle is moving in either the forward or reverse direction, a safety lock is provided, which will prevent the change of lever 100 from position 100A or 100B while the vehicle is still in motion.

What we claim is:

1. A power system including a closed gas pressure circuit and a closed hydraulic circuit comprising: a gas pressure generator, a first gas driven motor supplied by gas pressure from said generator and including a cylinder, a piston reciprocable in said cylinder, inlet and exhaust valves at each end of said cylinder, means for actuating said valves alternately and in timed relation, and means for regulating the degree of opening of said valves; a return line in said gas pressure circuit leading from said exhaust valves back to said pressure generator, a condenser in said return line, a second gas driven motor and a pressure responsive switch actuator in said return line ahead of said condenser, and a pump in said return line between said condenser and said pressure generator; an electric circuit having a source of current supply and including a switch actuated by said presure responsive switch actuator, an electric motor for driving said pump and controlled by said switch, said pressure generator including a heating means driven by a second electric motor, an electric generator driven by said second gas motor to supply current to said source, a second switch in said electric circuit for controlling the current supply to said second electric motor, a second pressure responsive switch actuator in the pressure line leading from said pressure generator for actuating said second switch, and cooling means for said condenser operated by said second gas motor; said hydraulic circuit incduding a hydraulic pump comprising a cylinder extending from said gas motor cylinder, a piston reciprocable in said pump cylinder and operated by said gas motor piston, valved inlet and outlet means for said pump cylinder, a hydraulic supply source and a heat exchanger connected to said pump cylinder inlet, a hydraulic motor connected to said pump cylinder outlet, cooling means for said heat exchanger driven by said second gas motor, and means in said hydraulic circuit for throttling, cutting off and reversing the fluid flow to said hydraulic motor; means for driving said valve actuating means of said first mentioned gas motor from said hydraulic motor, auxiliary means for driving said valve actuating means including means for cutting out said auxiliary means when the speed of said hydraulic motor reaches a predetermined rate, whereby the drive of said valve actuating means is solely from said hydraulic motor except when the latter is idling, at rest or operating in reverse.

2. A power system as set forth in claim 1 wherein said valve actuating means of said first mentioned gas motor includes a cam shaft and push rods actuated thereby for operating said valves, means for varying the movement of certain of said push rods and the opening of certain of said valves, said auxiliary means for driving said valve actuating means including a third electric motor and a gear train for initially driving said cam shaft, means for driving said cam shaft through part of said gear train when said hydraulic motor is operating in reverse, over-running clutches in said gear train and in said means for driving said valve actuating means from said hydraulic motor for driving said cam shaft in the forward direction by said hydraulic motor when the latter reaches a predetermined speed and for disconnecting said third electric motor from said cam shaft at such forward speed, said reversing means being located on the axis of the hydraulic motor, said hydraulic motor throttling and cutting off means including a hydraulic actuator, a fluid connection between said heat exchanger and the outlet of said hydraulic motor, a brake valve in said connection, a fluid passage extending between said connection and said hydraulic motor pump connection, and a one-way by-pass valve in said last mentioned fluid passage whereby said hydraulic motor will coast when throttled and will be gradually braked when said brake valve is closed.

3. A power system including a closed gas pressure circuit and a closed hydraulic circuit comprising: a gas pressure generator, a first gas driven motor supplied by gas pressure from said generator and including a cylinder, a piston reciprocable in said cylinder, inlet and exhaust valves at each end of said cylinder, means for actuating said valves alternately and in timed relation, and means for regulating the degree of opening of said valves; a return line in said gas pressure circuit leading from said exhaust valves back to said pressure generator, a condenser in said return line, a second gas driven motor and a pressure responsive switch actuator in said return line ahead of said condenser, and a pump in said return line between said condenser and said pressure generator; an electric circuit having a source of current supply and including a switch actuated by said pressure responsive switch actuator, an electric motor for driving said pump and controlled by said switch, said pressure generator including a heating means driven by a second electric motor, an electric generator driven by said second gas motor to supply current to said source, a second switch in said electric circuit for controlling the current supply to said second electric motor, a second pressure responsive switch actuator in the pressure line leading from said pressure generator for actuating said second switch, and cooling means for said condenser operated by said second gas motor; said hydraulic circuit including a hydraulic pump comprising a cylinder extending from said gas motor cylinder, a piston reciprocable in said pump cylinder and operated by said gas motor piston, valved inlet and outlet means for said pump cylinder, a hydraulic supply source connected to said pump cylinder inlet, and a hydraulic motor connected to said pump cylinder outlet, and means for driving said valve actuating means of said first mentioned gas motor from said hydraulic motor.

4. A power system comprising a closed fluid power circuit including a pressure line, a return line and a gas pressure generator; a first gas driven motor connected in said circuit between said pressure line and return line and driven by gas pressure from said generator, said first gas driven motor comprising a cylinder, a piston reciprocable therein, inlet and exhaust valves at opposite ends of the cylinder, means for actuating said valves in timed relation alternately at opposite ends of the gas motor cylinder, means for regulating the degree of opening of the valves and power developed by the piston; a condenser in said circuit in the return line; a second gas driven motor in the return line; a pump in said return line and driven by said second gas driven motor; cooling means for the condenser operated by said second gas driven motor; a second closed fluid circuit including a hydraulic pump comprising a cylinder extending from said first gas driven cylinder, a piston reciprocable therein and directly driven by said first gas driven motor piston; and a hydraulically operated mechanism having an inlet and an outlet connected to said hydraulic pump cylinder and provided with a source of fluid supply, said mechanism including a hydraulic motor operatively connected to said pump and to the means for actuating the valves in said gas motor.

5. In a power system having a closed gas pressure circuit and a closed hydraulic circuit, a pressure converter comprising a first cylinder, a piston reciprocable therein, inlet and exhaust valves at opposite ends of said first cylinder and communicably connected to said gas pressure circuit, means for actuating said valves in timed relation alternately at opposite ends of the cylinder, means for regulating the degree of opening of the valves and power developed by the piston, a second cylinder having inlet and exhaust valves communicably connected to said hydraulic circuit, a second piston reciprocable in said second cylinder and connected to said first piston, and a hydraulic motor operatively connected to said hydraulic circuit and to the means for actuating the valves in said first cylinder.

6. A power system comprising a closed fluid power circuit including a pressure line, a return line and a gas pressure generator; a first gas driven motor connected in said circuit between said pressure line and return line and driven by gas pressure from said generator, said first gas driven motor comprising a cylinder, a piston reciprocable therein, inlet and exhaust valves at opposite ends of the cylinder, means for actuating said valves in time relation alternately at opposite ends of the first gas driven motor cylinder; a condenser in said circuit in the return line; a second gas driven motor in the return line; a pump in said return line and driven by said second gas driven motor; cooling means for the condenser operated by said second gas driven motor; a second closed fluid circuit including a hydraulic pump comprising a cylinder extending from the first gas driven motor cylinder; a piston reciprocable therein and directly connected to said first gas driven poston; and a fluid operated mechanism having an inlet and an outlet connected to said pump cylinder, said mechanism including a hydraulic motor operatively connected to said pump and to the means for actuating the valves in said gas motor.

CONSTANTINOS H. VLACHOS.
EARL M. WARD.

References Cited in the file of this patent

UNITED STATES PATENTS

| Number | Name | Date |
|---|---|---|
| 27,104 | Burgin et al. | Feb. 14, 1860 |
| 183,081 | Thayer | Oct. 10, 1876 |
| 714,180 | Hendricks | Nov. 25, 1902 |
| 1,140,515 | Johnson | May 25, 1915 |
| 1,364,488 | Doble | Jan. 4, 1921 |
| 1,648,505 | Persu | Nov. 8, 1927 |
| 1,926,692 | Tarbox | Sept. 12, 1933 |
| 2,078,106 | Temple | Apr. 20, 1937 |
| 2,139,750 | Hicks | Dec. 13, 1938 |
| 2,203,731 | Keller | June 11, 1940 |
| 2,228,411 | Sheridan | Jan. 14, 1941 |
| 2,230,760 | Pateras-Pescara | Feb. 4, 1941 |
| 2,235,541 | Warren | Mar. 18, 1941 |
| 2,257,913 | Maranville | Oct. 7, 1941 |
| 2,326,821 | Boyle | Aug. 17, 1943 |
| 2,342,002 | Merrell | Feb. 15, 1944 |
| 2,418,294 | Flogaus et al. | Apr. 1, 1947 |
| 2,483,349 | Petty et al. | Sept. 27, 1949 |